United States Patent
Kumar et al.

(10) Patent No.: US 11,333,208 B1
(45) Date of Patent: May 17, 2022

(54) VEHICLE ALL-WHEEL DRIVE CONTROL SYSTEM

(71) Applicant: FORD GLOBAL TECHNOLOGIES, LLC, Dearborn, MI (US)

(72) Inventors: Abhinav Kumar, Canton, MI (US); Nicholas Edward McCubbin, Northville, MI (US)

(73) Assignee: Ford Global Technoogies, LLC, Dearborn, MI (US)

( * ) Notice: Subject to any disclaimer, the term of this patent is extended or adjusted under 35 U.S.C. 154(b) by 0 days.

(21) Appl. No.: 17/119,128

(22) Filed: Dec. 11, 2020

(51) Int. Cl.
   *F16D 48/06* (2006.01)
   *F16H 48/22* (2006.01)
   *F16H 48/20* (2012.01)

(52) U.S. Cl.
   CPC .......... *F16D 48/062* (2013.01); *F16H 48/22* (2013.01); *F16D 2500/10431* (2013.01); *F16D 2500/70406* (2013.01); *F16D 2500/70426* (2013.01); *F16H 2048/204* (2013.01)

(58) Field of Classification Search
   None
   See application file for complete search history.

(56) References Cited

U.S. PATENT DOCUMENTS

| | | |
|---|---|---|
| 2015/0019094 A1 | 1/2015 | Larkin et al. |
| 2016/0236568 A1 | 8/2016 | Quehenberger et al. |
| 2016/0280064 A1 | 9/2016 | Nozu et al. |
| 2017/0326976 A1 | 11/2017 | Burt et al. |
| 2018/0111479 A1 | 4/2018 | Grutter et al. |
| 2020/0031225 A1 | 1/2020 | Watanabe |

*Primary Examiner* — Timothy Hannon
(74) *Attorney, Agent, or Firm* — Vincent Mastrogiacomo; Brooks Kushman P.C.

(57) ABSTRACT

A vehicle includes a first axle, a second axle, a driveshaft, a first clutch, a second clutch, a third clutch, and a controller. The second axle has first and second half shafts. The second axle has first and second wheels. The driveshaft is disposed between the first and second axles and is coupled to the second axle. The first clutch is configured to selectively couple the driveshaft to the first axle. The second clutch is configured to selectively couple the first wheel to the first half shaft. The third clutch is configured to selectively couple the second wheel to the second half shaft. The controller is programmed to repeatedly connect the first axle to the second axle via the driveshaft by alternating between (i) closing the second clutch and then the first clutch and (ii) closing the third clutch and then the first clutch.

18 Claims, 3 Drawing Sheets

VEHICLE ALL-WHEEL DRIVE CONTROL SYSTEM

TECHNICAL FIELD

The present disclosure relates to control systems for all-wheel drive vehicles.

BACKGROUND

Vehicles may include all-wheel drive systems that are designed to improve vehicle maneuverability and decrease driver discomfort.

SUMMARY

A vehicle includes a first axle, a second axle, a driveshaft, and a controller. The first axle has a first differential and first clutch. The first differential includes first and second output shafts coupled to first and second wheels, respectively. The second axle has a second differential, a second clutch, and a third clutch. The second differential includes third and fourth output shafts coupled to third and fourth wheels, respectively. The second clutch is configured to couple and decouple the third wheel to and from the third output shaft. The third clutch is configured to couple and decouple the fourth wheel to and from the fourth output shaft. The driveshaft is selectively coupled to a carrier of the first differential by the first clutch and is coupled to a carrier of the second differential via a fixed gearing arrangement. The controller is programmed to, in response to a first command to connect the first axle to the second axle via the driveshaft, close the second clutch to transfer loads from the second axle to the driveshaft to increase the speed of the driveshaft and close the first clutch subsequent to closing the second clutch. The controller is further programmed to, in response to a command to disconnect the first axle from the second axle via the driveshaft subsequent to connecting the first axle to the second axle via the first command, open the first clutch and open the second clutch. The controller is further programmed to, in response to a second command to connect the first axle to the second axle via the driveshaft subsequent to disconnecting the first axle from the second axle and subsequent to connecting the first axle to the second axle via the first command, close the third clutch to transfer loads from the second axle to the driveshaft to increase the speed of the driveshaft and close the first clutch subsequent to closing the third clutch.

A vehicle includes a first axle, a second axle, a driveshaft, a first clutch, a second clutch, a third clutch, and a controller. The first axle has first and second output shafts. The first axle has first and second wheels. The second axle has third and fourth output shafts. The second axle has third and fourth wheels. The driveshaft is selectively coupled to the first axle via the first clutch and is coupled to the second axle via a fixed gearing arrangement. The second clutch is configured to couple and decouple the third wheel to and from the third output shaft. The third clutch is configured to couple and decouple the fourth wheel to and from the fourth output shaft. The controller is programmed to, in response to a first command to connect the first axle to the second axle via the driveshaft, close the second clutch and close the first clutch subsequent to closing the second clutch. The controller is further programmed to, in response to a second command to connect the first axle to the second axle via the driveshaft subsequent to the first command and subsequent to disconnecting the first axle from the second axle, close the third clutch and close the first clutch subsequent to closing the third clutch.

A vehicle includes a first axle, a second axle, a driveshaft, a first clutch, a second clutch, a third clutch, and a controller. The second axle has first and second half shafts. The second axle has first and second wheels. The driveshaft is disposed between the first and second axles and is coupled to the second axle. The first clutch is configured to selectively couple the driveshaft to the first axle. The second clutch is configured to selectively couple the first wheel to the first half shaft. The third clutch is configured to selectively couple the second wheel to the second half shaft. The controller is programmed to repeatedly connect the first axle to the second axle via the driveshaft by alternating between (i) closing the second clutch and then the first clutch and (ii) closing the third clutch and then the first clutch.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
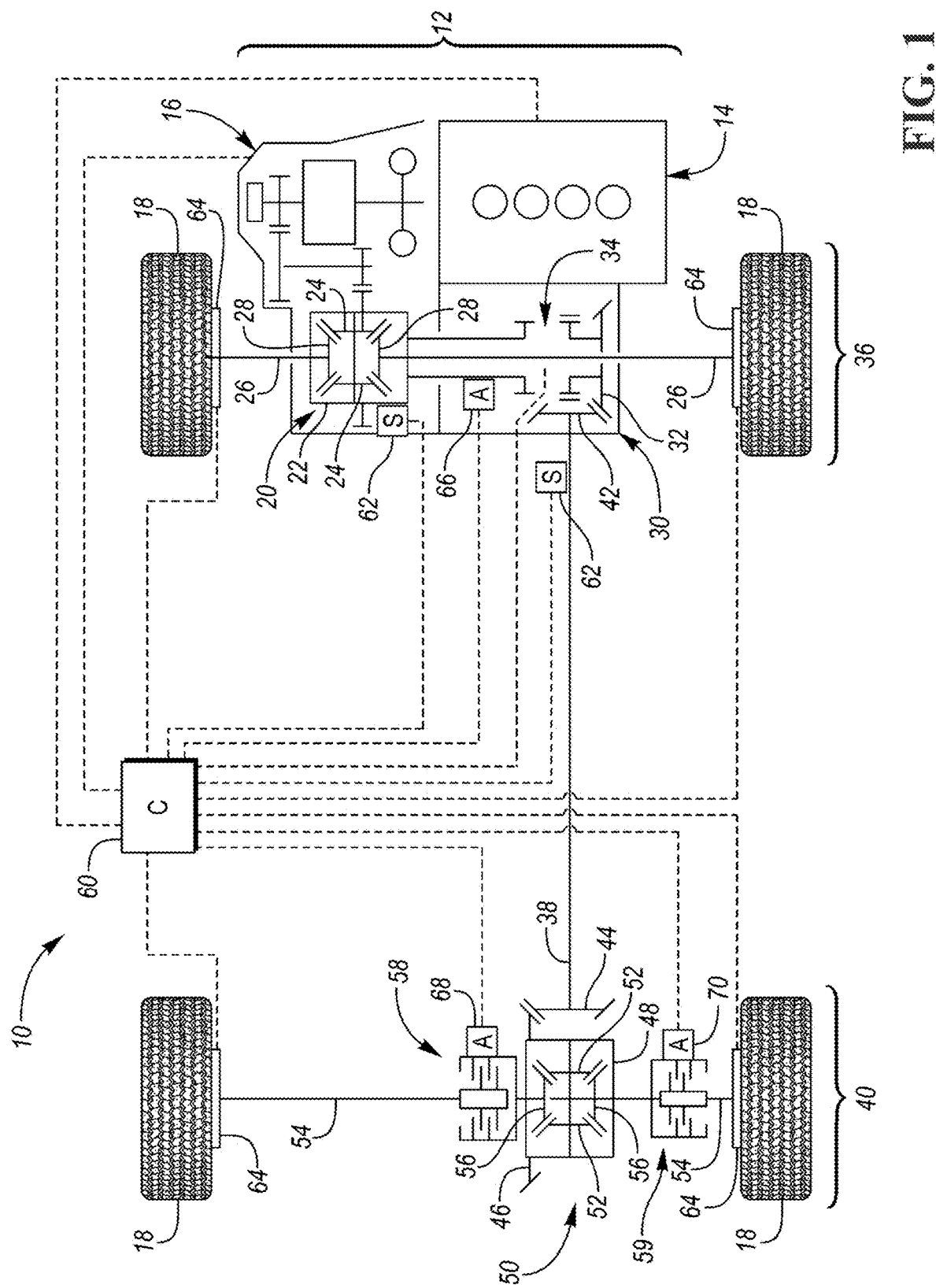
FIG. 1 is a schematic illustration of a representative vehicle and a representative vehicle powertrain.

Referring to FIG. 1, a schematic diagram representative of a vehicle 10 and a vehicle powertrain 12 is illustrated. The vehicle 10 may be an all-wheel-drive (AWD) vehicle where the powertrain 12 is capable of delivering power to all of the vehicle's wheels, whether full-time or on-demand. The powertrain 12 includes prime movers or power generating components (i.e., engines or electric motors) and the drivetrain. The drivetrain is the group of components that deliver power to the drive wheels, excluding the power generating components. In contrast, the powertrain 12 is considered to include both the power generating components and the drivetrain. The powertrain 12 includes an engine 14 and a transmission 16. The powertrain 12 may alternatively, or in addition to the engine 14, include an electric motor as a prime mover. If an electric motor is used as an alternative to the engine 14 it should be construed to perform all the functions of the engine 14 as described herein. The transmission 16 may include gearing arrangements configured to provide multiple gear ratios between an input and an output of the transmission 16. The engine 14 is connected to the input of the transmission 16 while drivetrain components that are configured to deliver power to drive wheels 18 are connected to outputs of the transmission 16. The engine 14 may be connected to the input of the transmission by a torque converter or a launch clutch.

A gearing arrangement is a collection of rotating elements and clutches configured to impose specified speed relationships among elements. Some speed relationships, called fixed speed relationships, are imposed regardless of the state of any clutches. A gearing arrangement imposing only fixed relationships is called a fixed gearing arrangement. Other speed relationships are imposed only when particular clutches are fully engaged. A gearing arrangement that selectively imposes speed relationships is called a shiftable gearing arrangement. A discrete ratio transmission has a shiftable gearing arrangement that selectively imposes a variety of speed ratios between an input shaft and an output shaft.

A group of elements are fixedly coupled to one another if they are constrained to rotate as a unit in all operating conditions. Elements can be fixedly coupled by spline connections, welding, press fitting, machining from a common solid, or other means. Slight variations in rotational displacement between fixedly coupled elements can occur such as displacement due to lash or shaft compliance. In contrast, two elements are selectively coupled by a clutch when the clutch constrains them to rotate as a unit whenever the clutch is fully engaged and they are free to rotate at distinct speeds in at least some other operating condition. Clutches include actively controlled devices such as hydraulically or electrically actuated clutches and passive devices such as one-way clutches. A clutch that holds an element against rotation by selectively connecting the element to a fixed component, such as a transmission housing, may be called a brake.

The transmission 16 may be a transaxle that includes both gearing elements that provide multiple gear ratios between an input and an output of the transmission 16 and a differential, which may be referred to as the front axle differential 20. The front axle differential 20 may comprise the output of the transmission 16. The front axle differential 20 includes a carrier 22, spider (or bevel) gears 24 that are rotatably coupled to the carrier 22, and output (or half) shafts 26 that include bevel gears 28 that mesh with the spider gears 24. The output shafts 26 are each fixedly coupled to a drive wheel 18. The vehicle 10 may also include a power transfer unit (PTU) 30. The PTU 30 may also be referred to as a power takeoff unit. The PTU 30 may include a ring gear 32 that is selectively coupled to the carrier 22 by power transfer unit clutch (PTU clutch) 34. The PTU clutch 34 may be a dog clutch. Collectively, the front axle differential 20 (including the carrier 22, spider gears 24, output shafts 26, bevel gears 28, etc.) and the PTU 30 (including the ring gear 32 and PTU clutch 34) may be referred to as the front axle 36. The front axle 36 may or may not also include the drive wheels 18 that are fixedly coupled to the output shafts 26. The output shafts 26 and the carrier 22 may all act as outputs of the front axle 36. The engine 14 (or other prime mover) may be configured to generate and transfer power and/or torque to the front axle 36.

A driveshaft 38 may be configured to couple the front axle 36 to a rear axle 40 (or rear drive unit). Driveshaft 38 may also be referred to as the propshaft. More specifically, the driveshaft 38 may include a first bevel gear 42 that meshes with the ring gear 32 in the PTU 30 and a second bevel gear 44 that meshes with a ring gear 46 that is affixed to a carrier 48 of a rear axle differential 50. The rear axle differential 50 also includes spider (or bevel) gears 52 that are rotatably coupled to the carrier 48, and output (or half) shafts 54 that include bevel gears 56 that mesh with the spider gears 52. The output shafts 54 are each fixedly coupled to a drive wheel 18. One of the half shafts 54 includes a first rear drive unit (RDU) clutch 58 that is configured to couple and decouple one of the drive wheels 18 from the rear axle differential 50. The other of the half shafts 54 includes a second RDU clutch 59 that is configured to couple and decouple the other of the drive wheels 18 from the rear axle differential 50. The first RDU clutch 58 and the second RDU clutch 59 may be friction type clutches that consist of alternatively friction plates and separator plates that are connected to opposing rotating components, such as shafts or drums. Collectively, the rear axle differential 50 (including the ring gear 46, carrier 48, spider gears 52, output shafts 54, bevel gears 56, etc.), the first RDU clutch 58, and second RDU clutch 59 may be referred to as the rear axle 40. The rear axle 40 may or may not also include the drive wheels 18 that are fixedly coupled to the output shafts 54. Collectively, the rear axle differential 50 (including the ring gear 46, carrier 48, spider gears 52, output shafts 54, bevel gears 56, etc.), the first RDU clutch 58, and second RDU clutch 59, excluding the drive wheels 18, may be referred to as the rear drive unit (RDU). When the PTU clutch 34 and the first RDU clutch 58 and/or the second RDU clutch 59 are in closed positions power and/or torque that is generated by the engine 14 is transferred from the front axle 36 to the rear axle 40 via the driveshaft 38.

When the PTU clutch 34, the first RDU clutch 58, and the second RDU clutch 59 are in open positions such that the ring gear 32 is decoupled from the carrier 22 and the drive wheels 18 on the rear axle 40 are decoupled from the rear axle differential 50, parasitic losses within the driveline may be decreased because specific components will cease rotating. Specifically, when the PTU clutch 34, the first RDU clutch 58, and the second RDU clutch 59 are in open positions the ring gear 32, driveshaft 38 and carrier 48 of the rear axle differential 50 will all cease to rotate decreasing parasitic losses and increasing the overall fuel economy of the vehicle 10.

The vehicle 10 further includes an associated controller 60 such as a powertrain control unit (PCU). While illustrated as one controller, the controller 60 may be part of a larger control system and may be controlled by various other controllers throughout the vehicle 10, such as a vehicle system controller (VSC). It should therefore be understood that the controller 60 and one or more other controllers can collectively be referred to as a "controller" that controls various actuators in response to signals from various sensors to control functions of various components.

The controller 60 may be configured to receive signals indicative of the speeds of the opposing sides (input and output sides) of the PTU clutch 34. The speed differential between the opposing sides of the PTU clutch 34 may be referred to as the slip speed of the PTU clutch 34. The controller 60 may receive the signals from speed sensors 62 that are configured to determine the rotational speeds of the opposing sides of the PTU clutch 34. One speed sensor 62 may be configured to measure the speed of the driveshaft 38 while the other is configured to measure the speed of the carrier 22 the front axle differential 20 in order to determine the rotational speeds of the opposing sides of the PTU clutch

34. Alternatively, the speed sensors 62 may be located on other rotating components that are on opposing sides of the PTU clutch 34, respectively. For example, one of the speed sensors 62 may be located directly on the input of the PTU clutch 34 while the other speed sensor is located on the ring gear 32.

The controller 60 may be configured to control the power, torque, and/or speed output of the engine 14 (or other prime movers such as electric motors in electric or hybrid vehicles) based on an accelerator and/or a brake pedal input or any other state or condition that may require an adjustment of the power, torque, and/or speed output of the engine 14 (or other prime mover). The controller 60 may further be configured to control various functions of the transmission 16, such as shifting, based on various inputs including accelerator and/or brake pedal input, a regenerative braking request (in vehicles that include electric generators configured to recharge a battery), other operator inputs (such as changing the position of a transmission gear selector), etc.

The controller 60 may be configured to control friction brakes 64 (or actuators thereof) based on input from the brake pedal or another state or condition of the vehicle 10 that may require braking. Additionally, the controller 60 may be configured to control the PTU clutch 34 (or an actuator 66 of the PTU clutch), the first RDU clutch 58 (or an actuator 68 of the first RDU clutch 58), and the second RDU clutch 59 (or an actuator 70 of the second RDU clutch 59). The actuator 66 of the PTU clutch 34, the actuator 68 of the first RDU clutch 58, and/or the actuator 70 of the second RDU clutch 59 may be electric motors (such as servo motors), electric solenoids, valves connected to hydraulic cylinders, valves connected to pneumatic cylinders, or any other actuator known in the art. More specifically, the controller 60 may be configured to open the PTU clutch 34, the first RDU clutch 58, and second RDU clutch 59 based on a need to decrease parasitic losses and increased fuel economy. Alternatively, the controller 60 may be configured to close both the PTU clutch 34, the first RDU clutch 58, and the second RDU clutch 59 based on a need to provide power to the drive wheels 18 of both the front axle 36 and rear axle 40.

The controller 60 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine 14 or vehicle 10.

Control logic or functions performed by the controller 60 may be represented by flow charts, graphs, or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, transmission, transaxle, and/or powertrain controller, such as controller 60. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

The controller 60 may be configured to receive various states or conditions of the various vehicle components illustrated in FIG. 1 via electrical signals. The electrical signals may be delivered to the controller 60 from the various components via input channels. Additionally, the electrical signals received from the various components may be indicative of a request or a command to change or alter a state of one or more of the respective components of the vehicle 10. The controller 60 includes output channels that are configured to deliver requests or commands (via electrical signals) to the various vehicle components. The controller 60 includes control logic and/or algorithms that are configured to generate the requests or commands delivered through the output channels based on the requests, commands, conditions, or states of the various vehicle components.

The input channels and output channels are illustrated as dotted lines in FIG. 1. It should be understood that a single dotted line may be representative of both an input channel and an output channel into or out of a single element. Furthermore, an output channel into one element may operate as an input channel to another element and vice versa.

It should be understood that the vehicle configuration described in FIG. 1 is merely exemplary and is not intended to be limited. Other non-hybrid, electric, or hybrid vehicle configurations should be construed as disclosed herein. Other vehicle configurations may include, but are not limited to, micro-hybrid vehicles, series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other vehicle configuration known to a person of ordinary skill in the art.

The PTU clutch 34 and either the first RDU clutch 58 or the second RDU clutch 59 may be utilized to connect the rear axle 40 to the front axle 36 via driveshaft 38. Either the first RDU clutch 58 or the second RDU clutch 59 is closed to increase the speed of driveshaft 38, which in turn decreases a slip speed across the PTU clutch 34. Once the slip speed across the PTU clutch 34 reaches a desired value or is within a desired range (e.g., once the slip across the PTU clutch 34 is less than a threshold), the PTU clutch 34 closes to connect the rear axle 40 to the front axle 36, so that power and torque can be transferred from the front axle 36, or more specifically, so that power and torque can be transferred from the engine 14 (or other powerplant), to the rear axle 40.

When the vehicle 10 is traveling over a curved road surface such that the vehicle 10 is turning, it may be desirable to close the RDU clutch (i.e., either the first RDU clutch 58 or the second RDU clutch 59) that is connected to the wheel 18 on the rear axle 40 that is moving at a speed that will bring the slip speed across the PTU clutch 34 to a value that is closer to a desired value or range. More specifically, when the vehicle 10 is traveling over a curved road surface such that the vehicle 10 is turning, it may be desirable to close the RDU clutch that will decrease the speed across the PTU clutch 34 within a shorter period of time (e.g., the RDU clutch that is connected to the wheel 18 of the rear axle 40 that is on the outer radius of the curved road surface since it will be spinning faster than the wheel 18 of the rear axle 40 that is on the inner radius of the curved road surface).

On the other hand, when the vehicle 10 is traveling in a straight line or within a tolerable range from a straight line, the speeds of each wheel 18 on the rear axle 40 will be approximately equal or within a tolerable deviation, and the speeds across the first RDU clutch 58 and the second RDU clutch 59 will also be approximately equal or within a tolerable deviation. Therefore, when the vehicle 10 is traveling in a straight line or within a tolerable range from a straight line, there may be little or no advantage between the first RDU clutch 58 and the second RDU clutch 59 to control the slip speed across the PTU clutch 34 when connecting the rear axle 40 to the front axle 36. If one of the first RDU clutch 58 or the second RDU clutch 59 is primarily used (e.g., is used most or all of the time) to control the slip speed across the PTU clutch 34 when connecting the rear axle 40 to the front axle 36, the friction plates of the RDU clutch that is being primarily used could wear out faster than the RDU clutch that is not being primarily used.

Furthermore, adaptation of the clutch driveline friction torque commanded to control the torque of the RDU clutches over the life of the vehicle, which may be based on vehicle speed and sump temperature within the RDU unit, may by impacted for the RDU clutch that is not primarily used for speed synchronization (i.e., to control the slip speed across the PTU clutch 34 when connecting the rear axle 40 to the front axle 36). The controller 60 may include software that adapts the desired torque of the RDU clutches individually over time relative to the vehicle speed and sump temperature as the characteristics of the RDU clutches change with use (e.g., as the friction surfaces of the friction plates and separator plates of the RDU clutches change over time due to wear). The desired torque values of the RDU clutches may be desired torque values when the respective RDU clutch is being used to control the slip speed across the PTU clutch 34 when connecting the rear axle 40 to the front axle 36 or may be desired torque values when the respective RDU clutch is being used to control the torque being delivered to a respective wheel 18 on the rear axle 40.

Figure 3:
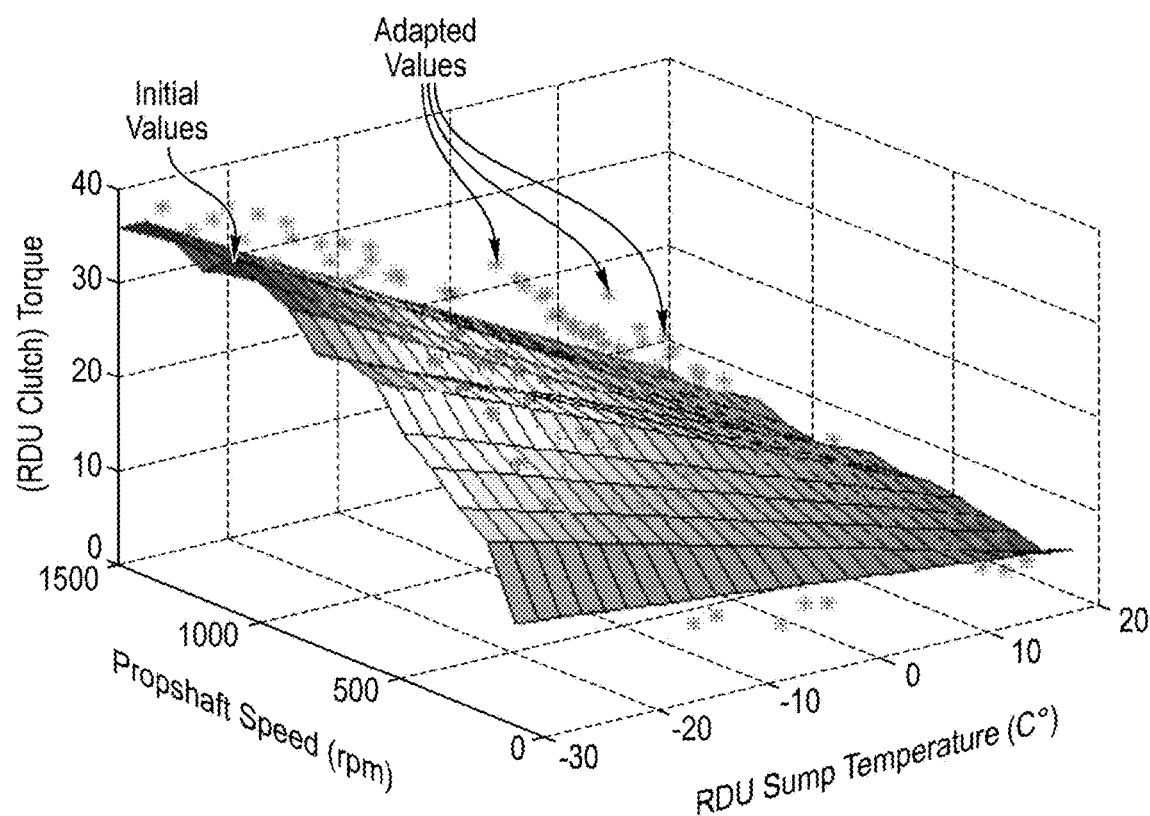
FIG. 3 is a graph illustrating torque values that are commanded to a clutch that is disposed in the rear axle.

An example of a map of desired torque values of an RDU clutch relative to vehicle speeds (shown as the speed of the propshaft or driveshaft 38) and sump temperatures are illustrated in FIG. 3, with the surface representing initial or calibrated torque values and the dots representing torque values that have been adapted or adjusted over the life of the RDU clutch. Each RDU clutch may include a separate map of desired torque values, similar the map in FIG. 3. Each RDU clutch may be adapted or adjusted over the life the respective RDU clutch based on the changing characteristics of the respective RDU clutch. The sump temperature may refer the temperature of a liquid located in a sump defined within the rear drive unit (RDU). The liquid may be utilized to lubricate the gears, shafts, bearings, RDU clutches, that are part of the rear drive unit (RDU) and/or rear axle 40. The liquid may also be used by an actuator, such as a hydraulic piston, to engage and disengage the first RDU clutch 58 and the second RDU clutch 59.

Figure 4:
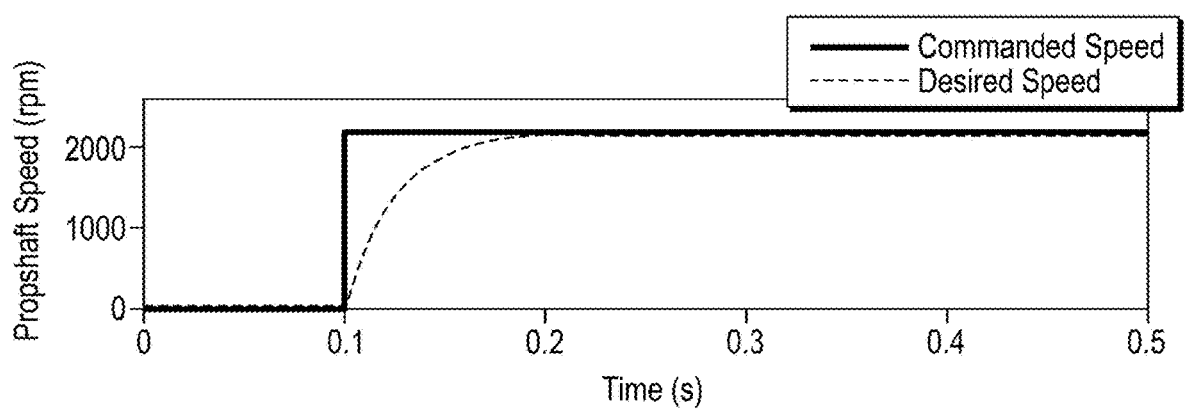
FIG. 4 is a graph illustrating rotational speed of a driveshaft that connects the rear axle to the front axle while reconnecting the rear axle to the front axle.

An example of controlling the slip speed across the PTU clutch 34 when connecting the rear axle 40 to the front axle 36 is illustrated in FIG. 4 as a desired speed of the propshaft or driveshaft 38. First, a commanded speed of shaft 38 that corresponds to a target slip speed across the PTU clutch 34 is generated. The target slip speed may be a specific desired value or may be a desired range of values (e.g., a value that is between ten rotations per minute and zero). The actual speed of shaft 38 is controlled by controlling one of the RDU clutches in order to drive the actual speed of shaft 38 toward the target speed of shaft 38 that corresponds to the target slip speed across the PTU clutch 34. Once the speed of shaft 38 reaches a value that corresponds to the target slip speed across the PTU clutch 34, the PTU clutch 34 may then be closed.

If both the first RDU clutch 58 and the second RDU clutch 59 are simultaneously used to control the slip speed across the PTU clutch 34 when connecting the rear axle 40 to the front axle 36, it may result in overshooting the torque on the front axle, which could be detrimental and lead to damaging the components on the front axle 36, such as the PTU clutch 34. The solution described herein includes alternating between using the first RDU clutch 58 and the second RDU clutch 59 to control the slip speed across the PTU clutch 34 when connecting the rear axle 40 to the front axle 36 when the wheel speeds on the rear axle 40 are within a desired range (e.g., when the wheel speeds are equal or within a tolerable range from being equal, which is indicative of the vehicle traveling in a straight line or within a tolerable range from a straight line). This solution will prevent excessive wear of one the RDU clutches relative to the other and will result in a more equal adaptation (e.g., FIG. 3) between the clutch driveline friction torque used to control the torque of the first RDU clutch 58 and the clutch driveline friction torque used to control the torque of the second RDU clutch 59.

Figure 2:
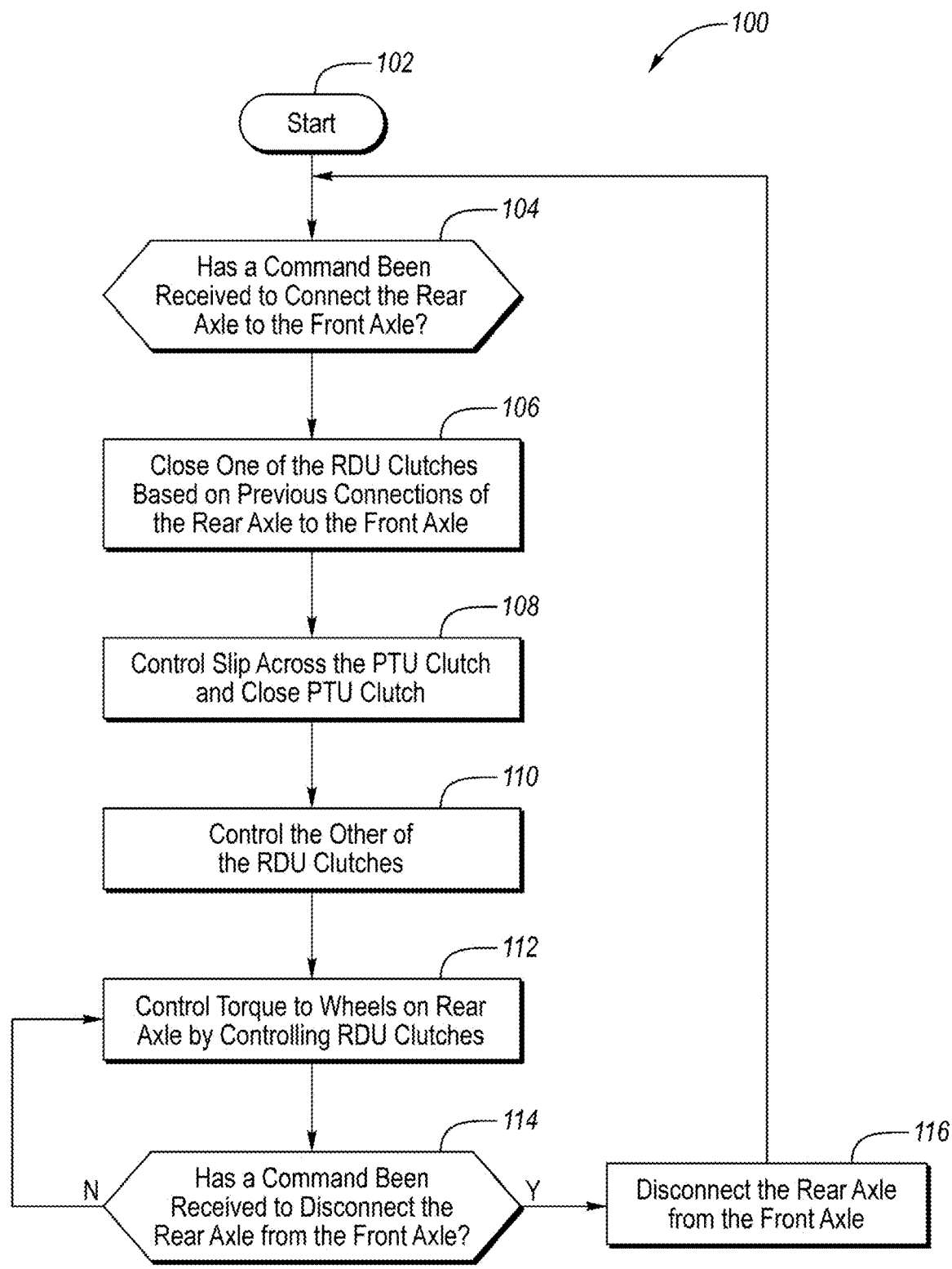
FIG. 2 is a flowchart illustrating a method of reconnecting a rear axle to a front axle.

Referring to FIG. 2, a flowchart of a method of reconnecting the rear axle 40 to the powertrain 12, or more specifically, to the front axle 36 is illustrated. The method 100 may be stored as control logic and/or an algorithm within the controller 60. The controller 60 may implement the method 100 by controlling the various components of the vehicle 10. The method 100 may be utilized to control connecting the rear axle 40 to the front axle 36 when the wheel speeds on the rear axle 40 are equal or are within a tolerable range from being equal, which is indicative of the vehicle traveling in a straight line or within a tolerable range from a straight line. The method 100 is initiated at start block 102. The method 100 may be initiated at start block 102 by turning a start key or ignition of the vehicle 10 to an "on" position.

The method 100 then moves on to block 104 where it is determined if a command has been received to connect the rear axle 40 to the front axle 36 via driveshaft 38. If the answer at block 104 is "NO," the method 100 recycles back to the beginning of block 104. If the answer at block 104 is "YES," the method 100 moves on to block 106 where one of the RDU clutches (i.e., either the first RDU clutch 58 or the second RDU clutch 59) is closed based on previous connections of the rear axle 40 to the front axle 36 in order to control the slip speed across the PTU clutch 34. More specifically, the controller 60 may be configured to alternate between utilizing either the first RDU clutch 58 or the second RDU clutch 59 for controlling the slip across the PTU clutch 34 at block 106 during each successive or sequential connection of the rear axle 40 to the front axle 36. For example, if the first RDU clutch 58 was closed at block 106 in response to a first command to the connect the rear axle 40 to the front axle 36, the second RDU clutch 59 will closed at block 106 in response to a second command to the connect the rear axle 40 to the front axle 36 that occurs after the first command to the connect the rear axle 40 to the front axle 36, which resulted in the rear axle 40 being connected to the front axle 36, and after a command to disconnect the rear axle 40 from the front axle 36, which resulted in the rear axle 40 being disconnected from the front axle 36. Each successive or sequential connection of the rear axle 40 to the front axle 36 may refer to all connections or only to connections where the wheel speeds on the rear axle 40 are equal or within a tolerable range from being equal, which is indicative of the vehicle traveling in a straight line or within a tolerable range from a straight line.

Next, at block 108, the slip across the PTU clutch 34 is then controlled to within a desired range (e.g., the slip across the PTU clutch 34 is decreased to a value that is between ten rotations per minute and zero) by controlling the torque across which of the first RDU clutch 58 or the second RDU clutch 59 was closed at block 106. Controlling the torque across the first RDU clutch 58 or the second RDU clutch 59 may be accomplished by adjusting an engagement pressure of an actuator (e.g., actuator 68 or actuator 70), such as hydraulic cylinder, that is utilized to engage and disengage the first RDU clutch 58 or the second RDU clutch 59. Once the slip across the PTU clutch 34 is controlled to within the desired range, the PTU clutch 34 is closed at block 108 connecting the rear axle 40 to the front axle 36.

The method 100 then moves on to block 110, where the other of the first RDU clutch 58 and the second RDU clutch 59 (i.e., the RDU clutch that was not closed at block 106) is closed. Once the first RDU clutch 58, the second RDU clutch 59, and the PTU clutch 34 are all closed, the torque being delivered to each wheel 18 on the rear axle 40 may be controlled independently at block 112 by adjusting the torque of the first RDU clutch 58 and/or the torque of the second RDU clutch 59. More specifically, the torque being delivered to each wheel 18 on the rear axle 40 may be controlled independently by adjusting the engagement pressures of actuator 68 and/or actuator 70 to adjust the torque of the first RDU clutch 58 and/or the torque of the second RDU clutch 59, respectively.

It should be noted that if the steps to connect the rear axle 40 to the front axle 36 between blocks 104 and 110 included, in sequential order, closing the first RDU clutch 58, closing the PTU clutch 34, and closing the second RDU clutch 59, the previous connection and the following connection of the rear axle 40 to the front axle 36 will include, in sequential order, closing the second RDU clutch 59, closing the PTU clutch 34, and closing the first RDU clutch 58 such that the controller 60 alternates between using the first RDU clutch 58 and the second RDU clutch 59 to control the slip across the PTU clutch 34 during each successive or sequential connection of the rear axle 40 to the front axle 36.

The method 100 next moves onto block 114 where it is determined if a command has been received to disconnect the rear axle 40 to the front axle 36 via driveshaft 38. If the answer at block 114 is "NO," the method 100 recycles back to the beginning of block 114. If the answer at block 114 is "YES," the method 100 moves on to block 116 where the rear axle 40 is disconnected from the from axle 36 via opening the first RDU clutch 58, the second RDU clutch 59, and the PTU clutch 34. The method 100 then returns to the beginning of block 104.

It should be understood that the flowchart in FIG. 2 is for illustrative purposes only and that the method 100 should not be construed as limited to the flowchart in FIG. 2. Some of the steps of the method 100 may be rearranged while others may be omitted entirely. For example, the method 100 could be started at block 112 if the RDU clutches were engaged when the vehicle 10 was turned on. It should also be understood that the designations of first, second, third, fourth, etc. for axles, clutches, differentials, gears, carriers, output shafts, half shafts, commands, or any other component, state, or condition described herein may be rearranged in the claims so that they are in chronological order with respect to the claims.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:
1. A vehicle comprising:
   a first axle having a first differential and first clutch, the first differential including first and second output shafts coupled to first and second wheels, respectively;
   a second axle having a second differential, a second clutch, and a third clutch, the second differential including third and fourth output shafts coupled to third and fourth wheels, respectively, the second clutch configured to couple and decouple the third wheel to and from the third output shaft, and the third clutch configured to couple and decouple the fourth wheel to and from the fourth output shaft;
   a driveshaft selectively coupled to a carrier of the first differential by the first clutch and coupled to a carrier of the second differential via a fixed gearing arrangement; and
   a controller programmed to,
      in response to a first command to connect the first axle to the second axle via the driveshaft, close the second clutch to transfer loads from the second axle to the driveshaft to increase a speed of the driveshaft and close the first clutch subsequent to closing the second clutch,
      in response to a command to disconnect the first axle from the second axle via the driveshaft subsequent to connecting the first axle to the second axle via the first command, open the first clutch and open the second clutch, and in response to a second command to connect the first axle to the second axle via the driveshaft subsequent to disconnecting the first axle from the second axle and subsequent to connecting the first axle to the second axle via the first command, close the third clutch to transfer loads from the second axle to the driveshaft to increase the speed of the driveshaft and close the first clutch subsequent to closing the third clutch.

2. The vehicle of claim 1, wherein the controller is further programmed to, in response to the first command to connect the first axle to the second axle, close the third clutch subsequent to closing the first clutch.

3. The vehicle of claim 2, wherein the controller is further programmed to, in response to, the first, second, and third clutches being closed subsequent to the first command to connect the first axle to the second axle, control torque being delivered to third and fourth wheels via controlling the engagement pressure of the second and third clutches, respectively.

4. The vehicle of claim 1, wherein the controller is further programmed to, in response to the first command to connect the first axle to the second axle, adjust a slip speed of the first clutch to within a desired range prior to closing the first clutch and subsequent to closing the second clutch.

5. The vehicle of claim 1, wherein the controller is further programmed to, in response to the second command to connect the first axle to the second axle, close the second clutch subsequent to closing the first clutch.

6. The vehicle of claim 5, wherein the controller is further programmed to, in response to, the first, second, and third clutches being closed subsequent to the second command to connect the first axle to the second axle, control torque being delivered to third and fourth wheels via controlling the engagement pressure of the second and third clutches, respectively.

7. The vehicle of claim 1, wherein the controller is further programmed to, in response to the second command to connect the first axle to the second axle, adjust a slip speed of the first clutch to within a desired range prior to closing the first clutch and subsequent to closing the third clutch.

8. A vehicle comprising:
a first axle having first and second output shafts and having first and second wheels;
a second axle having third and fourth output shafts and having third and fourth wheels;
a driveshaft selectively coupled to the first axle via a first clutch and coupled to the second axle via a fixed gearing arrangement;
a second clutch configured to couple and decouple the third wheel to and from the third output shaft;
a third clutch configured to couple and decouple the fourth wheel to and from the fourth output shaft; and
a controller programmed to,
in response to a first command to connect the first axle to the second axle via the driveshaft, close the second clutch and close the first clutch subsequent to closing the second clutch, and
in response to a second command to connect the first axle to the second axle via the driveshaft subsequent to the first command and subsequent to disconnecting the first axle from the second axle, close the third clutch and close the first clutch subsequent to closing the third clutch.

9. The vehicle of claim 8, wherein the controller is further programmed to, in response to the first command to connect the first axle to the second axle, close the third clutch subsequent to closing the first clutch.

10. The vehicle of claim 9, wherein the controller is further programmed to, in response to, the first, second, and third clutches being closed subsequent to the first command to connect the first axle to the second axle, control torque being delivered to third and fourth wheels via controlling the engagement pressure of the second and third clutches, respectively.

11. The vehicle of claim 8, wherein the controller is further programmed to, in response to the first command to connect the first axle to the second axle, adjust a slip speed of the first clutch to within a desired range prior to closing the first clutch and subsequent to closing the second clutch.

12. The vehicle of claim 8, wherein the controller is further programmed to, in response to the second command to connect the first axle to the second axle, close the second clutch subsequent to closing the first clutch.

13. The vehicle of claim 12, wherein the controller is further programmed to, in response to, the first, second, and third clutches being closed subsequent to the second command to connect the first axle to the second axle, control torque being delivered to third and fourth wheels via controlling the engagement pressure of the second and third clutches, respectively.

14. The vehicle of claim 8, wherein the controller is further programmed to, in response to the second command to connect the first axle to the second axle, adjust a slip speed of the first clutch to within a desired range prior to closing the first clutch and subsequent to closing the third clutch.

15. A vehicle comprising:
a first axle;
a second axle having first and second half shafts and having first and second wheels;
a driveshaft disposed between the first and second axles and coupled to the second axle;
a first clutch configured to selectively couple the driveshaft to the first axle;
a second clutch configured to selectively couple the first wheel to the first half shaft;
a third clutch configured to selectively couple the second wheel the second half shaft; and
a controller programmed to repeatedly connect the first axle to the second axle via the driveshaft by alternating between (i) closing the second clutch and then the first clutch and (ii) closing the third clutch and then the first clutch.

16. The vehicle of claim 15, wherein the controller is further programmed to, in response to each command to connect the first axle to the second axle, close the other of the second clutch or the third clutch subsequent to closing the first clutch such that the first, second, and third clutches are closed.

17. The vehicle of claim 16, wherein the controller is further programmed to, in response to, the first, second, and third clutches being closed subsequent to the each command to connect the first axle to the second axle, control torque being delivered to first and second wheels via controlling the engagement pressure of the second and third clutches, respectively.

18. The vehicle of claim 15, wherein the controller is further programmed to, in response to the each command to connect the first axle to the second axle, adjust a slip speed of the first clutch to within a desired range prior to closing the first clutch and subsequent to closing the second clutch or the third clutch.

* * * * *